United States Patent

Ferris

[15] 3,638,905

[45] Feb. 1, 1972

[54] PROPULSION SYSTEM SAFETY VENT

[72] Inventor: De Lacy F. Ferris, Van Nuys, Calif.

[73] Assignee: The United States of America as represented by the Secretary of the Navy

[22] Filed: June 17, 1970

[21] Appl. No.: 46,945

[52] U.S. Cl. .............................................. 251/94, 60/39.09
[51] Int. Cl. ........................................................ F16k 35/00
[58] Field of Search ............... 60/39.09, 39.48; 257/260; 251/94

[56] References Cited

UNITED STATES PATENTS

| | | | |
|---|---|---|---|
| 1,891,119 | 12/1932 | Stover | 137/542 X |
| 3,008,516 | 11/1961 | Weiss | 60/39.09 X |
| 3,353,358 | 11/1967 | Lovingham | 60/39.48 X |
| 3,384,111 | 5/1968 | Webb | 251/94 X |
| 3,425,217 | 2/1969 | Layendecker | 60/39.48 |

*Primary Examiner*—Henry T. Klinksiek
*Attorney*—Richard S. Sciascia, Q. Baxter Warner and Gayward N. Mann

[57] ABSTRACT

A spring loaded missile poppet valve is located adjacent the gas generator of a missile and is adapted, during missile storage, to vent overboard any fluid or gas the pressure of which exceeds the valve spring preload. During firing operations, the ignited starting charge creates a fuel and oxidizer expelling pressure which seals the vent by locking the poppet closed. Such action prevents loss of pressurization gas.

5 Claims, 3 Drawing Figures

PATENTED FEB 1 1972

3,638,905

START
CHARGE
CAVITY
34

INVENTOR
DE LACY F. FERRIS
BY
ATTORNEYS

PROPULSION SYSTEM SAFETY VENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to safety valves and more particularly to fuel tank safety valves employed in a missile propulsion system.

2. Description of the Prior Art

A hazard inherent in many rocket or missile liquid propulsion systems is the possibility of fuel or oxidizer leakage. For example, if the fuel leaks from a pressure chamber for expelling fuel into the fuel tank, decomposition may occur and build up sufficient pressure to start the propulsion system. In order to obviate such a possibility it is desirable to provide a vent means to allow escape of any leaking on decomposition products which vent means will automatically close when the propulsion system starts.

SUMMARY OF THE INVENTION

The present invention comprises a safety valve for use in a missile propulsion system wherein fuel and a fuel expelling gas supplied by a "start charge" are separated by a deformable diaphragm. Upon ignition of the start charge a fuel expelling pressure is generated on one side of the diaphragm which then moves to exert pressure on the fuel and expell it from the fuel tank. In the event of rupture of the diaphragm the leaking fuel is expelled and pressure buildup is avoided. The valve may be located adjacent the fuel expulsion gas generator and includes a vent poppet valve normally closed by spring preload pressure. Upon missile firing, the vent poppet valve is inactivated by a locking poppet actuated by the start charge pressure.

During storage the vent poppet is free to vent excess fluids overboard. Upon ignition of the start charge, the locking poppet is actuated against the vent poppet and both are locked in place by a snapring.

STATEMENT OF THE OBJECTS OF THE INVENTION

An object of the present invention is to provide a means to vent gases or liquids in the event of a ruptured fuel expulsion diaphragm.

Another object is to provide a means for sealing off such vent when missile ignition is initiated.

A further object is to provide such a vent which is simple in construction and reliable in operation.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
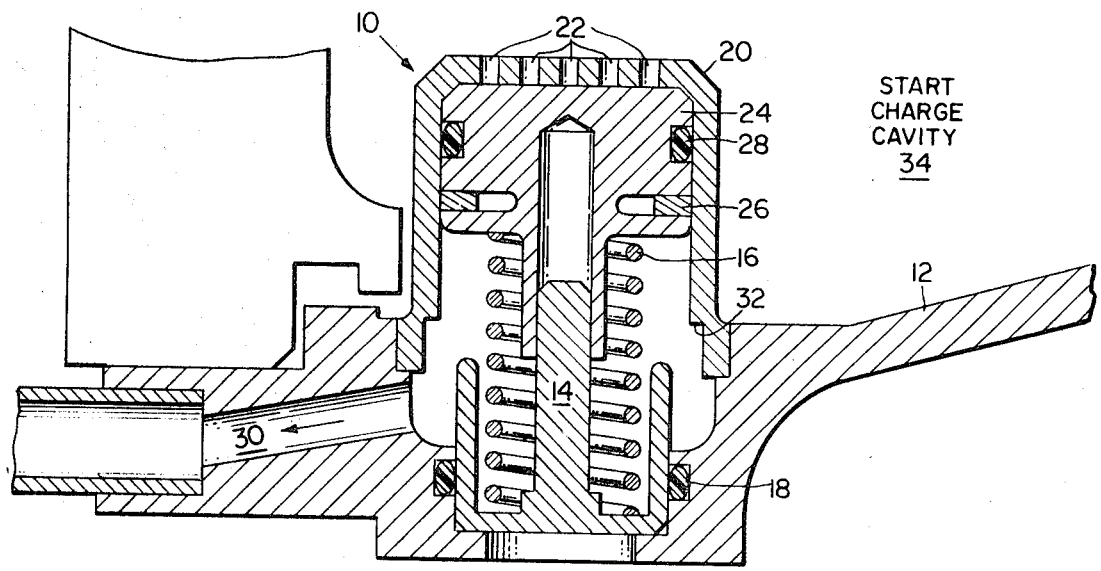
FIG. 1 is a vertical sectional view of the invention at rest.

In a liquid propelled missile fuel system, the diaphragm separating the fuel from its source of pressurization may permit leakage of fuel into the pressurization chamber. To prevent such an occurrence, the present invention employs a vent valve 10 which may be suitably mounted in the missile gas generator housing cover 12 and is designed to vent gases from the fuel tank. The valve includes a vent poppet 14 biased by a coil spring 16 and sealed when seated by O-ring 18. A cage 20 having end apertures 22 is supported by the gas generator housing cover 12 and receives a locking poppet 24 bearing a snapring 26 and sealed by O-ring 28.

Figure 2:
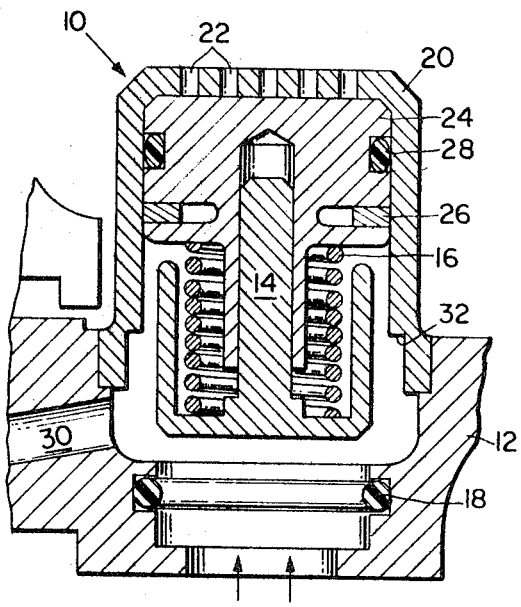
FIG. 2 is a change position view of the device of FIG. 1 with the vent passage open.
Figure 3:
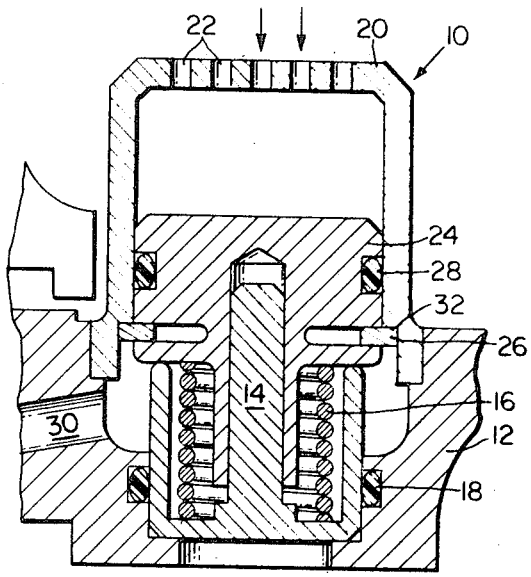
FIG. 3 is a similar view with the vent sealed and locked.

During storage, in the event of leakage of fuel as indicated by the arrows in FIG. 2 the vent poppet 14 is free to lift and disengage from O-ring 18 against the coil spring 16 preload pressure. Gases or liquids are then vented overboard as required through vent 30. When the fuel tank pressure drops below the coil spring 16 preload pressure, the vent poppet 14 reseats. Upon firing of the missile, a "start charge" is ignited within start charge cavity 34, creating a pressure shown by the arrows in FIG. 3 which passes through apertures 22 and forces the locking poppet 24 downwardly against the vent poppet 14. Sufficient downward movement, the snapring 26 pops outwardly under ledge 32 within cage 20 and locks both poppets in the down position thereby preventing further venting of fuel from the fuel tank through vent 30.

While there may be a slight variance in operating parameters, the vent poppet 14 preferably overcomes the coil spring 16 preload pressure at 42 p.s.i.g. and the locking poppet is preferably activated at 76 p.s.i.g.

Obviously many modifications and variations of the present invention are possible in the light of the above teachings. It is therefore to be understood that within the scope of the appended claims the invention may be practiced otherwise than as specifically described.

I claim:

1. A safety valve positioned in a missile gas generator housing cover and adapted to relieve excess pressure, said valve comprising:
   a housing having an inlet opening through which leaking propellant products may be admitted into the valve housing;
   said housing also having an outlet opening through which such leaking propellant products may be vented;
   a sealed vent positioned in said housing;
   a sealed locking poppet operatively associated with said vent poppet, said locking poppet movable in response to ignition pressures;
   means positioned in said housing between the vent poppet and the locking poppet and adapted to both close the vent poppet and to bias the locking poppet in said housing against a suitable pressure preload and;
   locking means adapted to operate after the locking poppet moves in response to the ignition pressures against said vent poppet forcing the latter poppet to a closed position, said locking means preventing return movement of the locking poppet;
   wherein the venting poppet is free to vent excessive fuel products overboard against the pressure preload but upon ignition the locking poppet is actuated against the vent poppet and the two poppets are locked in place to prevent venting.

2. The safety valve as defined in claim 1 wherein:
   the means positioned in the housing to close the vent poppet and bias the locking poppet against a suitable pressure preload includes a coil spring.

3. The safety valve as defined in claim 2 wherein:
   the vent poppet is sealed in the closed position against pressure leakage by an adjacent O-ring.

4. The safety valve as defined in claim 2 wherein:
   the locking means adapted to prevent the poppets from moving when the vent poppet is in a closed position includes a snapring located in the outer periphery of the locking poppet;
   said snapring being locked in position under a snapring retaining ledge in the housing after the locking poppet has moved the vent poppet to a closed position; and
   an O-ring seals the locking poppet against loss of pressure.

5. The safety valve as defined in claim 2 wherein: the vent poppet overcomes the coil spring preload pressure at substantially 42 p.s.i.g. and the locking poppet is actuated at substantially 76 p.s.i.g.

* * * * *

UNITED STATES PATENT OFFICE
CERTIFICATE OF CORRECTION

Patent No. 3,638,905          Dated 1 February 1972

Inventor(s) De Lacy F. Ferris

It is certified that error appears in the above-identified patent and that said Letters Patent are hereby corrected as shown below:

In the Claims, Claim 1, Column 2, Line 36, the word --poppet-- should be inserted after "vent".

Signed and sealed this 29th day of August 1972.

(SEAL)
Attest:

EDWARD M. FLETCHER, JR.
Attesting Officer

ROBERT GOTTSCHALK
Commissioner of Patents